United States Patent [19]

Murphy

[11] Patent Number: 5,917,434
[45] Date of Patent: Jun. 29, 1999

[54] INTEGRATED TAXIMETER/GPS POSITION TRACKING SYSTEM

[75] Inventor: Michael D Murphy, Sunnyvale, Calif.

[73] Assignee: Trimble Navigation Limited, Sunnyvale, Calif.

[21] Appl. No.: 08/490,561

[22] Filed: Jun. 15, 1995

[51] Int. Cl.$^6$ ................................................. G08G 1/123
[52] U.S. Cl. .................... 340/991; 340/994; 340/995; 701/201; 701/207; 701/217
[58] Field of Search ........................... 340/990, 991–995, 340/988, 994, 434; 342/357, 457; 364/443, 449.1, 450, 460, 424.04; 235/95 R, 96; 701/201, 202, 207, 208, 209, 213, 215, 216, 217

[56] References Cited

U.S. PATENT DOCUMENTS

| | | | |
|---|---|---|---|
| 4,217,484 | 8/1980 | Gerst | 235/92 DN |
| 4,731,613 | 3/1988 | Endo et al. | 364/450 |
| 4,837,700 | 6/1989 | Ando et al. | 364/449 |
| 4,903,212 | 2/1990 | Yokouchi et al. | 364/449 |
| 5,014,206 | 5/1991 | Scribner et al. | 364/449 |
| 5,075,693 | 12/1991 | McMillan et al. | 364/449 |
| 5,214,789 | 5/1993 | George | 455/33.2 |
| 5,365,516 | 11/1994 | Jandrell | 340/991 |
| 5,416,712 | 5/1995 | Geier et al. | 364/450 |
| 5,434,788 | 7/1995 | Seymour et al. | 701/207 |
| 5,512,904 | 4/1996 | Bennett | 342/357 |
| 5,525,998 | 6/1996 | Geier | 364/449 |
| 5,548,822 | 8/1996 | Yogo | 455/68 |

*Primary Examiner*—Jeffery A. Hofsass
*Assistant Examiner*—Van T. Trieu
*Attorney, Agent, or Firm*—Patrick T. King

[57] ABSTRACT

A taximeter system includes a taximeter or trip meter for a truck integrated with an integral GPS receive/computer for providing GPS position and time information. The odometer input pulses to the taximeter are accurately calibrated by using GPS position, velocity, and time information to generate corrected odometer pulses which are provided to the odometer input terminal of the taximeter. The GPS system is integrated into the taximeter for calibrating and cross checking of input odometer pulses to provide reliable, consistent distance measurements by the taximeter. The integrated taximeter and GPS system provided according to the invention uses GPS position, velocity, and time information to produce incontrovertibly accurate corrected, odometer input pulses and GPS time signals for the taximeter to precisely compute elapsed time and distance traveled. Dead reckoning operation of the system is available when the GPS receiver has service outages. A calibrated mileage meter for trucks also includes an integral GPS receive/computer for providing accurately calibrated odometer pulses to the mileage meter. Certain locations can be tagged and a printer and recorder are recorded for documentation of trip information such as when a vehicle enters or leaves a state, proof of a path followed by a vehicle, delivery of good at a certain site, operation within speed limits, certification of operation within a certain geographic area.

4 Claims, 6 Drawing Sheets

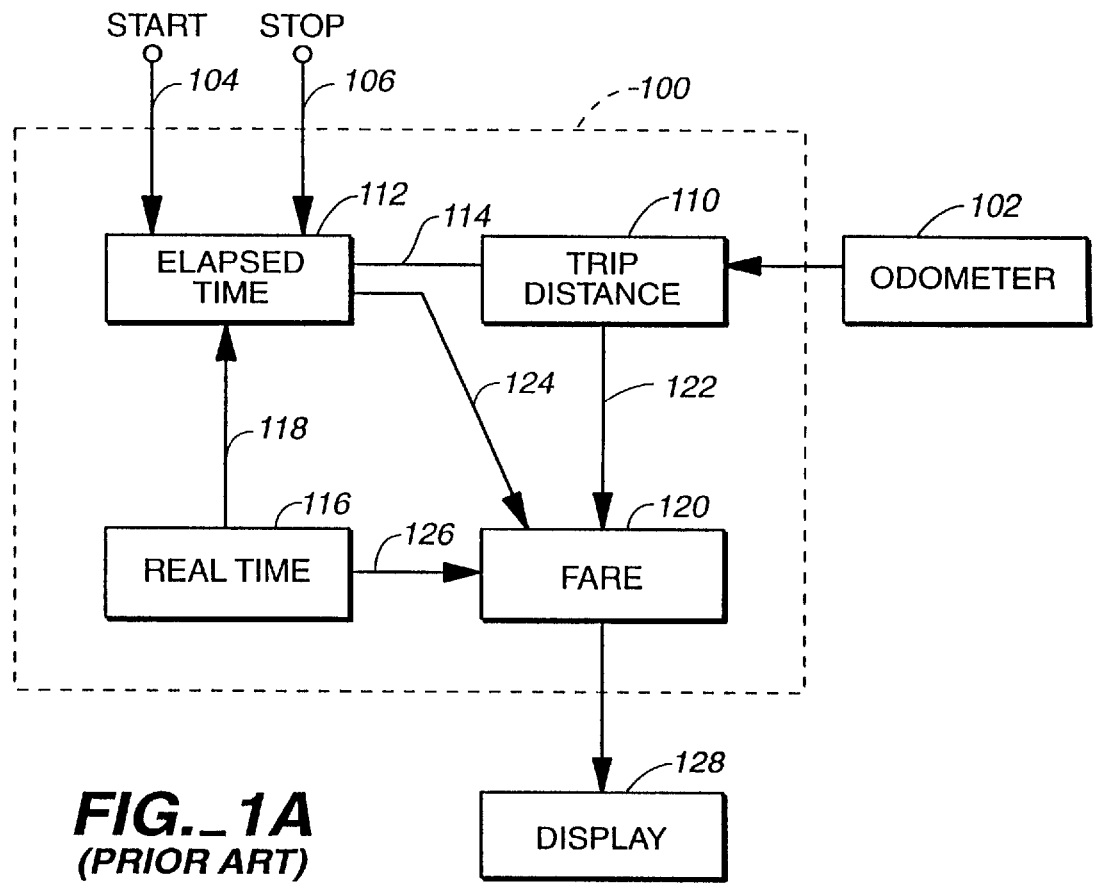
FIG._1A
*(PRIOR ART)*
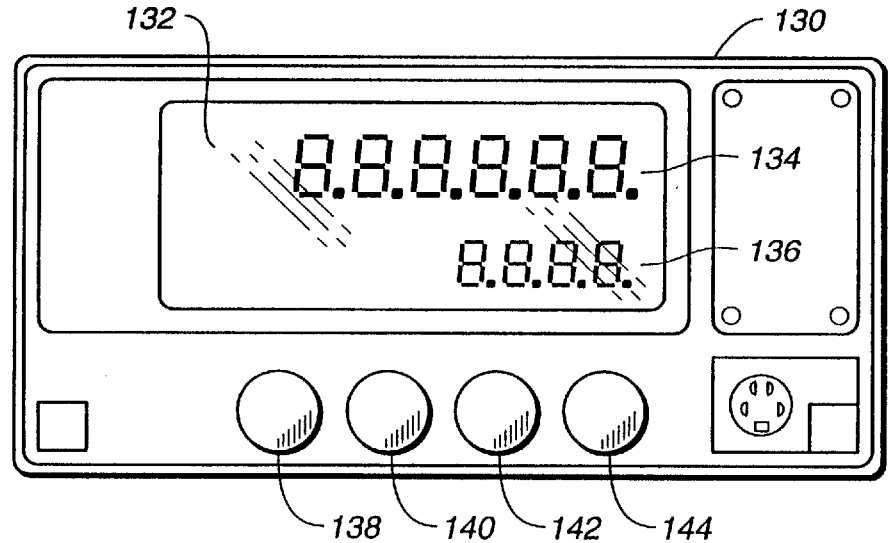
FIG._1B

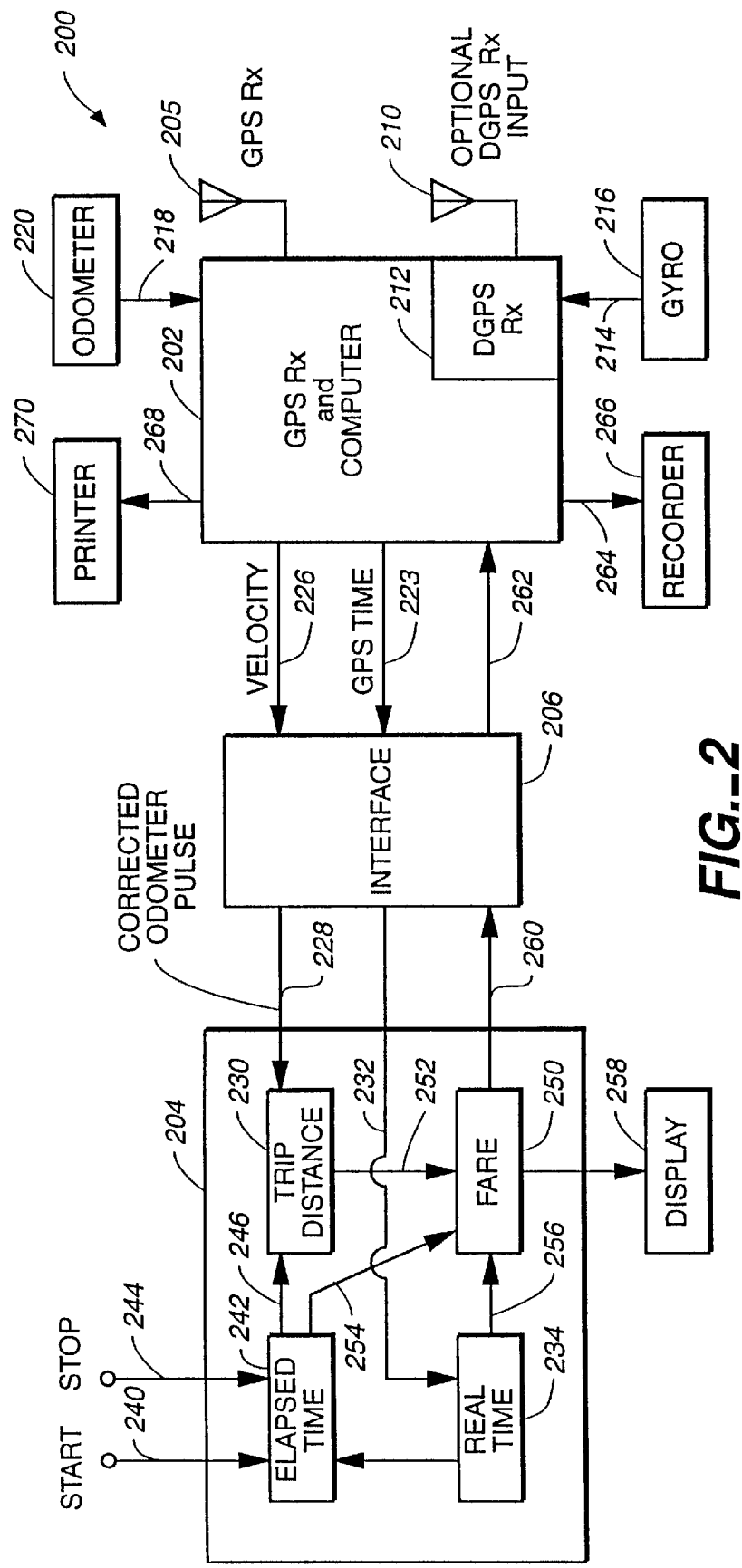
FIG._2

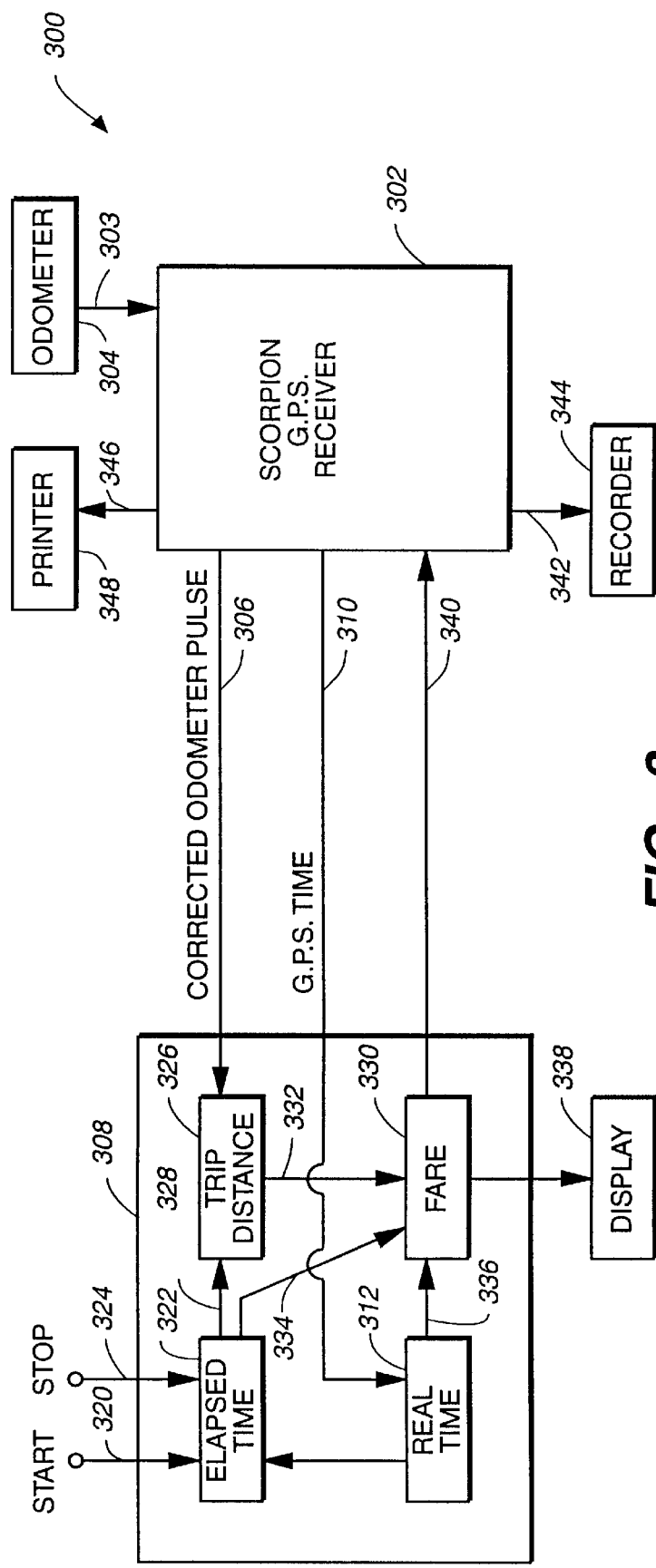
FIG._3

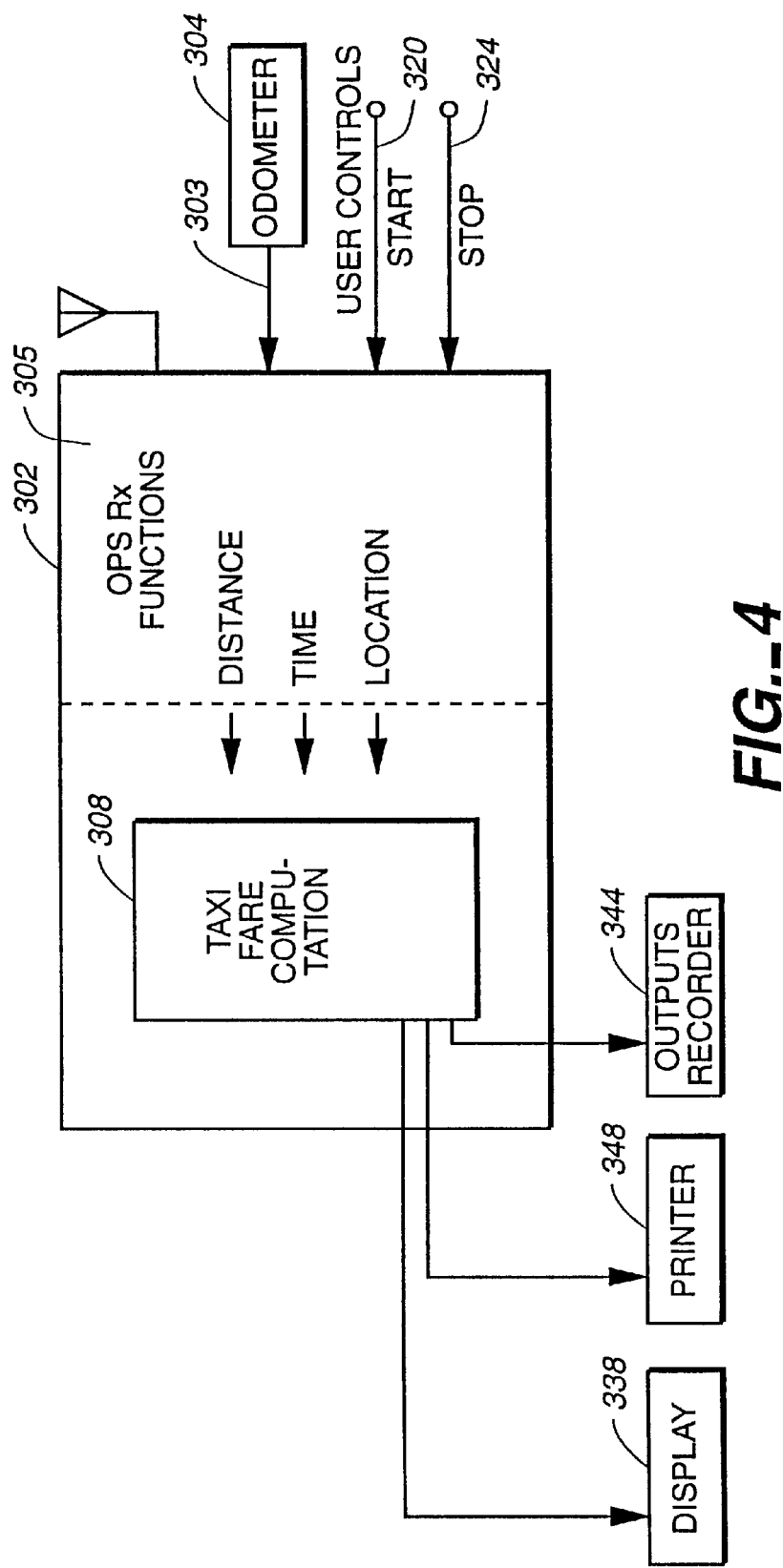
FIG._4

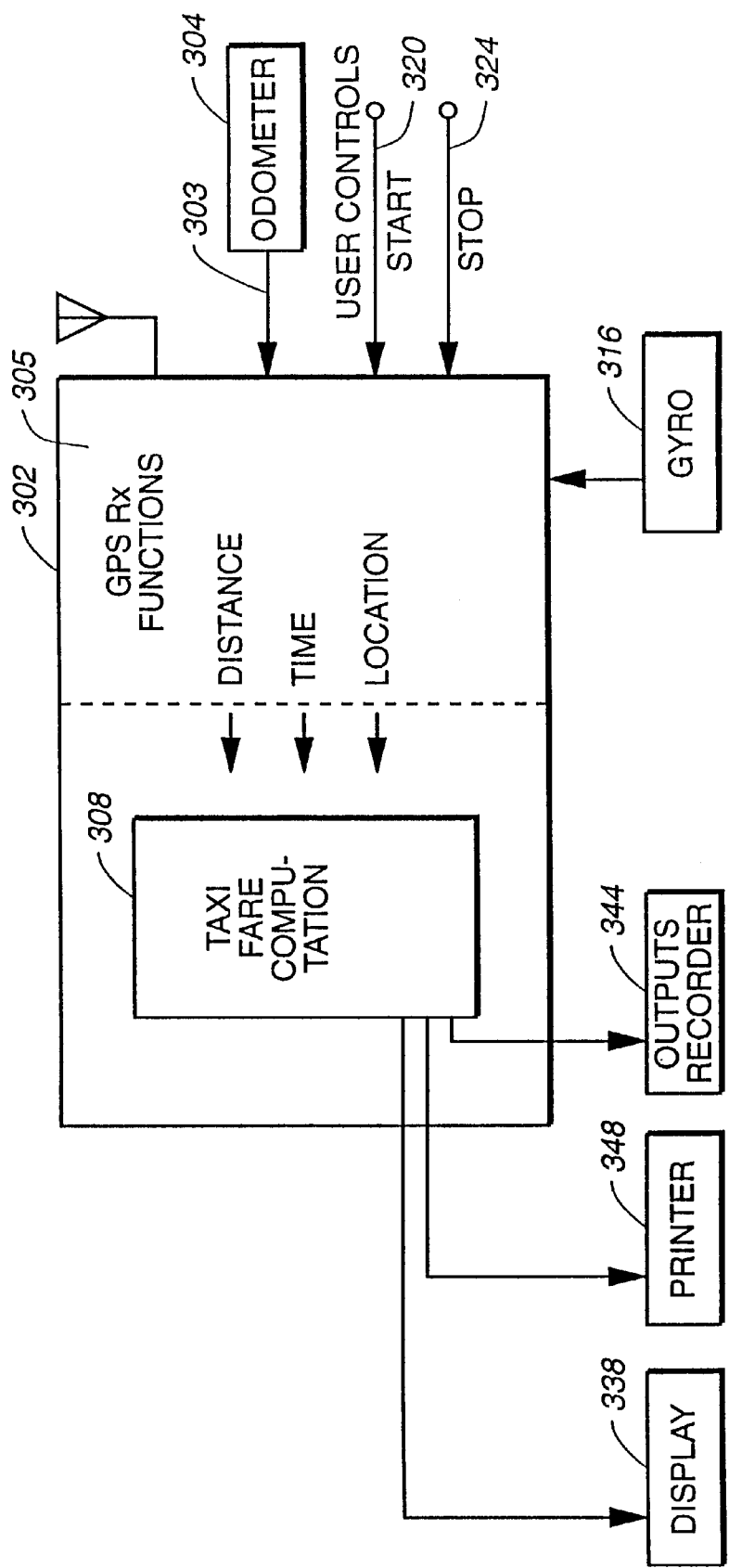
FIG._5

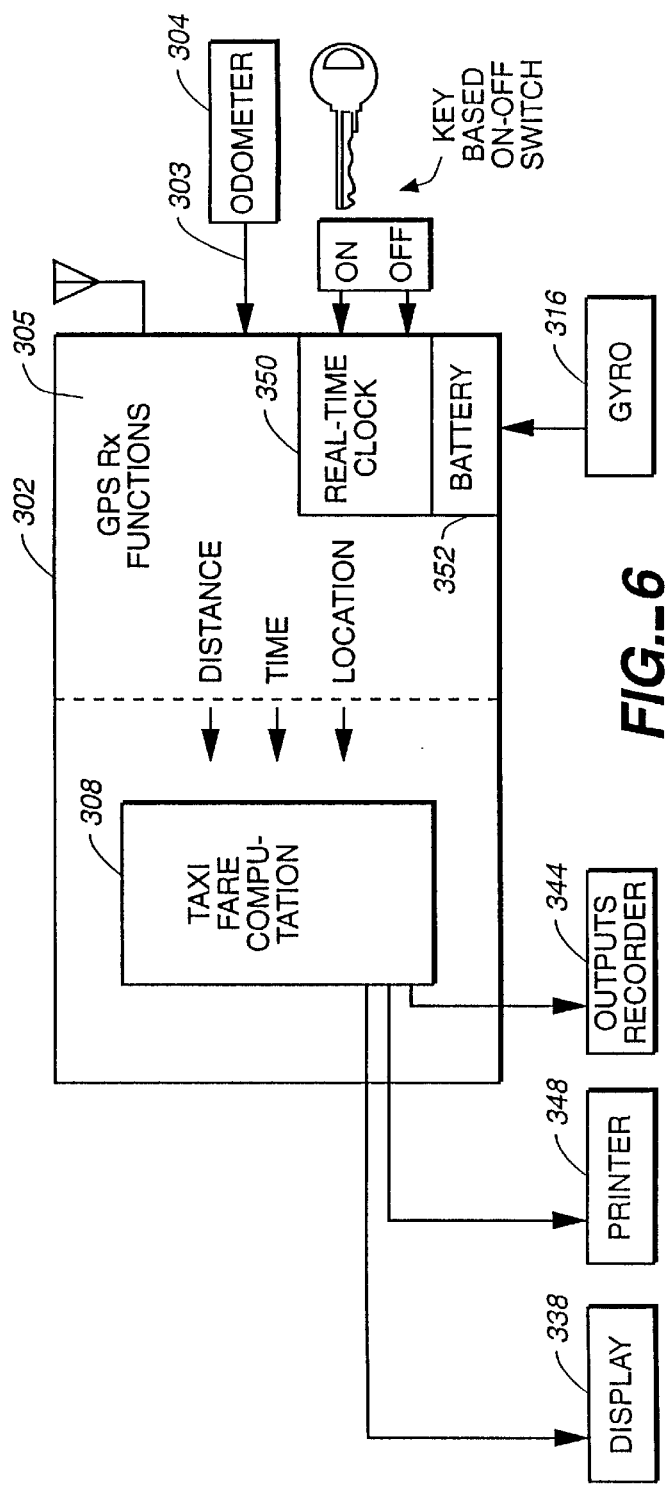
FIG._6
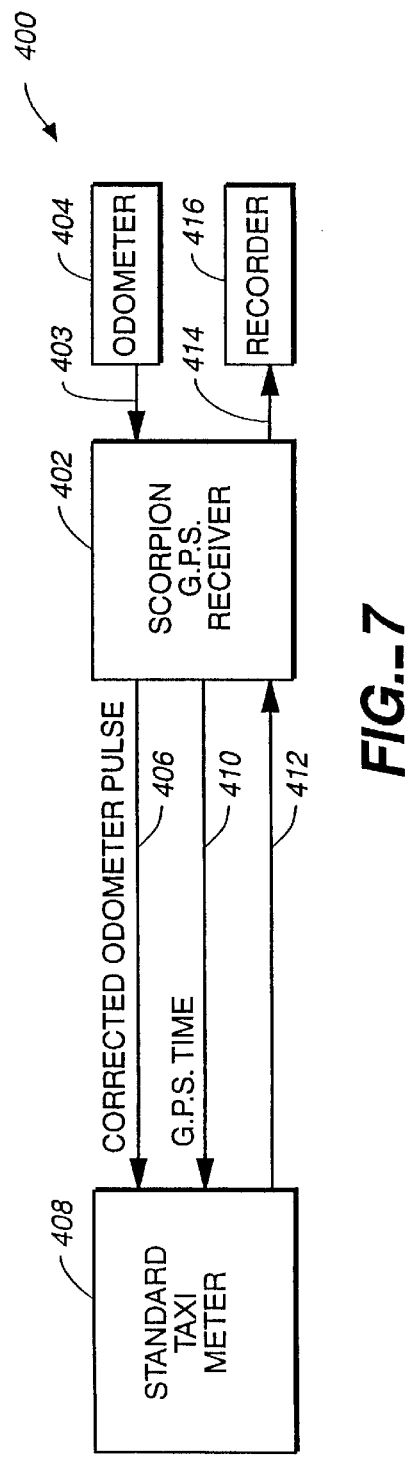
FIG._7

INTEGRATED TAXIMETER/GPS POSITION TRACKING SYSTEM

TECHNICAL FIELD

The present invention relates generally to measurement of the movement of a vehicle, and, more particularly, to accurately measuring the distance moved by a vehicle with rotating wheels.

BACKGROUND OF THE INVENTION

Mileage meters for commercial vehicles such as taxicabs and long-haul trucks are calibrated and certified by governmental agencies for a specific tire pressure and a certain rim size. When the tire pressure and rim size of a vehicle are changed, distance errors of 3 percent can be obtained. For consumers, increased mileage readings by a taximeter increase their costs. For a state governmental agency which taxes a long-haul truck based on the number of miles driven by the long-haul truck within the state, shortened mileage readings result in significant revenue shortfall for the state.

Consequently, a need exists for a technique of calibrating mileage meters, such as taximeters and long-haul truck mileage meters.

A taximeter or mileage meter system which is based exclusively on GPS techniques could theoretically provide accurate distance information and could be continuously calibrated. However, a taximeter or mileage meter using only a GPS system is limited because of outages caused by passage of a vehicle with such a system through tunnels, canyons, dense urban areas, etc.

A taximeter or mileage meter is used to provide distance measurements. U.S. Pat. No. 5,014,206 granted to Scribner et al. on May 7, 1991, and entitled "Tracking System" discloses a system used for determining and recording the geographic location of a vehicle during predetermined events using a GPS system. The Scribner et al. system is adapted to a particular application by configuring a switch or sensor to record the occurrence of a desired event, such as the opening of a garbage truck tailgate at a waste dump site. Passive RF tags are used to identify a vehicle as being at a particular site at a particular time.

SUMMARY OF THE INVENTION

It is, therefore, an object of the present invention to provide a technique for calibrating a taximeter or mileage meter.

It is another object of the invention to provide a calibrated system which can function during outages of a calibration signal. The invention provides incontestably accurate taximeters and trip meters with accurate elapsed time measurements and total distance traveled based on GPS time measurements and "calibrated" odometer pulses. GPS outages are compensated for with dead-reckoning equipment. Thus, the present invention is able to accurately measure the distance moved by a vehicle with rotating wheels by calibrating, correcting, and/or verifying odometer readings.

In accordance with these and other objects of the invention, a combined taximeter or mileage meter and a GPS system is provided for calibration of the taximeter or mileage meter. Means are provided for calibrating the taximeter with the GPS information. For purposes of the present invention, GPS information includes position, velocity, and time information.

A taximeter system according to the invention includes a taximeter integrated with an integral GPS receive/computer for providing GPS position, velocity, and time information. The odometer input pulses to the taximeter are accurately calibrated by using GPS position, velocity, and time information to generate corrected odometer pulses which are provided to the odometer input terminal of the taximeter. The GPS system is integrated into the taximeter for calibrating and cross checking of input odometer pulses to provide reliable, consistent distance measurements by the taximeter. The integrated taximeter and GPS system provided according to the invention uses GPS position, velocity, and time information to produce incontrovertibly accurate corrected, odometer input pulses and GPS time signals for the taximeter to precisely compute elapsed time and distance traveled. Dead reckoning operation of the system is available when the GPS receiver has service outages. A calibrated mileage meter for trucks also includes an integral GPS receive/computer for providing accurately calibrated odometer pulses to the mileage meter. Certain locations can be tagged and recorded for documentation of trip information such as when a vehicle enters or leaves a state, proof of a path followed by a vehicle, delivery of good at a certain site, operation within speed limits, certification of operation within a certain geographic area.

A system for calibrating a taximeter according to the invention includes a GPS receiver/computer system having means for receiving input odometer pulses from an odometer where the GPS receiver/computer system providing GPS position, velocity, and time information as output signals. Interface means are provided for receiving the GPS position, velocity, and time information from the GPS receiver/computer system and for providing calibrated odometer output pulses as a function of the received GPS position, velocity, and time information. A taximeter is provided having means for receiving calibrated odometer output pulses from the interface means and for receiving the GPS position, velocity, and time information. The taximeter has means for computing a fare from the calibrated odometer output pulses and GPS position, velocity, and time information provided by the GPS receiver/computer system.

The GPS receiver/computer system includes dead reckoning means for providing location information to the GPS computer system during GPS receiver system service outages. In one embodiment of the present invention, the GPS receiver/computer system includes differential GPS means for improving the accuracy of the GPS receiver/system.

A system is also provided for calibrating a mileage meter for vehicles such as local delivery trucks or long-haul trucks. The system is similar to the taximeter and includes a GPS receiver/computer system providing GPS position, velocity, and time information, where the GPS receiver/computer system includes means for receiving the GPS position, velocity, and time information from the GPS receiver/computer system and for providing calibrated odometer output pulses as a function of the received GPS position, velocity, and time information. The system includes dead reckoning means for providing location information to the GPS computer system during GPS receiver system service outages. The system also includes a mileage meter having an input terminal for receiving the calibrated odometer pulses where the mileage meter includes means for computing mileage from the calibrated odometer pulses. In one embodiment, differential GPS means are provided for improving the accuracy of the GPS receiver/system.

Means are included for providing trip information and for recording trip information. The trip information includes various types of information, such as, for example, information: about when a vehicle enters and leaves predetermined zones, establishing proof of a path followed by a vehicle, about delivery of goods by a vehicle at a certain site, about operation of a vehicle within speed limits, and about certification of operation of a vehicle within a certain geographic area.

A method of calibrating a taximeter installed in a taxi vehicle is provided according to the invention. The method includes the steps of providing GPS position, velocity, and time information as output signals from a GPS receiver/computer system, receiving input odometer pulses from an odometer, providing calibrated odometer output pulses as a function of the received GPS position, velocity, and time information and computing a fare in a taximeter from the calibrated odometer output pulses provided by said GPS receiver/computer system. The method also includes the step of using a dead reckoning navigation system for providing location information to the GPS computer system during GPS receiver system service outages. In one embodiment, differential GPS means are used for improving the accuracy of the GPS receiver/system. The method includes the steps of providing trip information and of displaying trip information. The step of providing trip information includes providing information about several items, including proof of a path followed by a taxi vehicle, operation of a vehicle within speed limits, and certification of operation within a certain geographic area.

The invention includes a method of calibrating odometer pulses received by a mileage meter for a vehicle such a local delivery truck or a long haul truck. The steps of this method include receiving raw odometer pulses from an odometer, providing GPS position, velocity, and time information from a GPS receiver/computer system, receiving the GPS position, velocity, and time information from the GPS receiver/computer system, providing calibrated odometer output pulses as a function of the received GPS position, velocity, and time information, and computing mileage from the calibrated odometer pulses. The method also includes the steps of providing trip information and recording such trip information. The step of providing trip information includes the step of providing information about when a vehicle enters and leaves a predetermined zone, about proof of a path followed by a vehicle, about delivery of goods at a certain site, about operation within speed limits, and about certification of operation within a certain geographic area. Differential GPS is used to improve the accuracy of the GPS receiver/system.

BRIEF DESCRIPTION OF THE DRAWINGS

The accompanying drawings which are incorporated in and form a part of this specification, illustrate embodiments of the invention and, together with the description, serve to explain the principles of the invention:

FIG. 1A is a block diagram of a prior art taximeter system which receives odometer pulses and which provides measurement elapsed time, distance, real time, and a fare to be charged, based only on the odometer pulses.

FIG. 1B is a view of a typical taximeter package which includes a customer display with computed fare and distance traveled readouts.

FIG. 2 is a block diagram of a taximeter system which uses a GPS system for independent calibration of the odometer pulses delivered to the taximeter, where the GPS system includes a dead-reckoning capability.

FIG. 3 is a block diagram of a taximeter system which uses a GPS system having a direct output terminal which provides corrected odometer pulses to a taximeter computer.

FIG. 4 is a block diagram of a fully integrated taximeter/GPS system in accordance with the present invention.

FIG. 5 is a block diagram of a fully integrated taximeter/GPS system including a gyro module in accordance with the present invention.

FIG. 6 is a block diagram of a fully integrated taximeter/GPS system including a key-activated recording system in accordance with the present invention.

FIG. 7 is a block diagram of a mileage measurement and logging system which uses a GPS system having a direct output terminal at which are provided corrected odometer pulses.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

FIG. 1A is a block diagram of an electronic taximeter 100 which receives input odometer pulses on a signal line 102 from a vehicle speed sensor. The taximeter and vehicle speed sensor are calibrated and certified to be accurate under standard conditions, such as a specified tire pressure and a specified rim size. The pulse rate of the input odometer pulses is supposed to be accurately proportionate to the speed of the taxi, with no compensation being provided for changes such as tire pressure and/or rim size, etc. When the tire pressure and rim size of a vehicle, such as a taxi, are changed from the standards, errors of up to 3 percent can result, resulting in increased costs to taxi riders.

At the start of a trip, a taxi driver initiates a start-of-trip signal on an input signal line 104 to activate operation of the taximeter and to start an elapsed time measurement. At the end of the trip, the taxi driver initiates an end-of- trip signal on an input signal line 106 to stop the elapsed time measurement and operation of the taximeter.

The electronic taximeter 100 includes a module 110 which produces a distance measurement, or trip distance, as a function of the number of input odometer pulses received on the signal line 102 during an elapsed time period. Elapsed time is measured in an elapsed-time module 112 which is turned on and off respectively by the start-of-trip signal and the end-of-trip signal. Elapsed time information is provided from the elapsed-time module 112 as an input to the trip distance module 110 on a signal line 114. Real time-of-day information is provided by a real-time module 116 to the elapsed time module 112 on a signal line 118.

A fare computation module 120 receives input signals from the various other modules. Specifically, as shown in FIG. 1A, fare computation module 120 receives input from the trip distance module 110 on a signal line 122, from the elapsed-time module 112 on a signal line 124, and from the real-time module 116 on a signal line 126. The fare computation module 120 computes a fare in accordance with a fare computation tariff as a function, for example, of an initial fare charge, trip distance, elapsed time, real time, and various "extras", such as additional passengers and baggage. A display module 128 displays the computed fare and distance traveled.

FIG. 1B shows a typical taximeter package which includes a customer display 130 for a taximeter system having a LED, or similar, display panel 132. Computed Fare is displayed on one line 134 of the LED display panel 132. Another line 136 of the LED display panel 132 displays Trip Distance. A start-of-trip button 138 is operated to provide an input signal on input signal line 104 of FIG. 1A to activate operation of the taximeter and to start an elapsed time measurement. An end-of-trip button 140 is operated to provide an end-of-trip signal on the input signal line 106 to stop the elapsed time measurement and operation of the taximeter. Buttons 142, 144 are used to input Extra information such as additional passengers and luggage.

FIG. 2 is a block diagram of one embodiment of a taximeter system 200, according to the invention. A GPS system is integrated into the taximeter for calibrating and cross checking of input odometer pulses to provide reliable, consistent distance measurements by the taximeter. This taximeter system 200 combines a GPS receiver/computer module 202 with a taximeter computer module 204 through an interface circuit 206. The GPS receiver/computer module 202 and the interface circuit 206 are integrated with the taximeter functions in the taximeter housing.

The GPS receiver/computer system 202 includes a GPS receiver/computer circuit 208 and a suitable GPS antenna 209. For differential GPS (DGPS) operation, an optional DGPS antenna 210 and DGPS receiver 212 are provided for receipt of correction information, which is, for example, transmitted locally from a fixed GPS reference-receiver site.

The GPS receiver/computer 208 measures its velocity with respect to that of a satellite by measuring the Doppler shift of the signals received from the satellite. Using an ephemeris and almanac, the position of the satellites are precisely known. Some of the Doppler shift measured by the GPS system is due to the satellite and the balance of the Doppler shift is due to the velocity of the GPS receiver. The GPS system processes this velocity information and distance is calculated as the product of velocity and time.

One embodiment of the receiver/computer 208 is implemented using, for example, a commercially available GPS receiver system provided by Trimble Navigation of Sunnyvale, Calif. and called the Trimble Placer GPS/DR system. The Trimble Placer GPS/DR system is a mobile GPS system which also includes a dead reckoning (DR) capability incorporated into an I/O processor circuit board. The Placer DR system uses GPS signals as its primary means of determining position and velocity. Because of its dead reckoning capability, the Placer DR system provides for accurate, reliable, vehicle location in areas where GPS signals are temporarily blocked.

The receiver/computer 208 as implemented by a Placer DR system circuit board is packaged in a standard taximeter housing with the taximeter circuits. The Placer DR system uses dead reckoning when the GPS satellite signals are blocked by features such as tall buildings, tunnels, multi-deck bridges, etc. Input signals to the GPS system for dead reckoning operation are provided on a signal bus 214 from a heading sensor 216, such as a gyroscopic system provided, for example, as a piezoelectric vibrating-beam gyro. The Placer DR system continuously calibrates its DR sensors with GPS signals.

Accuracy of the combined GPS and dead-reckoning system is improved with a U.S. patent application, Ser. No. 08/068,983, filed May 28, 1993 by Geier et al. for a "Navigation System for Adaptive Weighting of GPS and Dead-Reckoning Information". The Geier et al. Patent is incorporated herein by reference as background material. Geier et al. provides improved navigational data to a vehicle user by blending GPS solutions and dead-reckoning (DR) solutions using modified Kalman filters.

A signal line 218 provides connections for signals from a vehicle's digital pulse odometer 220 to the GPS receiver/computer 208. The GPS module 202 uses the heading sensor information from the heading sensor 216 and the odometer pulses to generate DR position and velocity. Information provided by the GPS receiver/computer module 208 includes latitude, longitude, velocity, time, and direction of travel.

The interface circuit 206 receives GPS time information on a signal line 224 from the GPS receiver/computer module 202. The interface circuit 206 receives GPS position, velocity, and time information on a signal line 226 from the GPS receiver/computer module 202. The interface circuit uses the GPS position, velocity, and time information to provide corrected odometer pulses on a signal line 228 to a trip distance module 232. The corrected odometer pulses are provided from a pulse stuffer/subtractor module includes in the interface circuit 206. GPS time signals are provided from the interface circuit 206 on a signal line 234 to a real time module 234.

A taxi driver provides a start-of-trip signal on an input signal line 240 to activate operation of the taximeter system 200 and to start an elapsed time measurement. Elapsed time is counted in an elapsed-time circuit 242 which is turned on by the start-of-trip signal. At the end of the trip, the taxi driver provides an end-of-trip signal on an input signal line 244 to stop the elapsed time measurement.

The trip distance module 230 receives the corrected odometer pulses on line 228 and elapsed time information on a signal line 246 from the elapsed time module 242.

The corrected odometer pulses on signal line 228 are calibrated by the GPS system, which verifies and corrects for errors in the odometer pulses received by the GPS receiver/computer module 202 from the odometer 220.

A fare computation module 250 receives an output signal from the trip distance module 230 on a signal line 252. The fare computation module 250 receives an output signal from the elapsed-time module 242 on a signal line 254. The fare computation module 250 receives an output signal from the real-time module 234 on a signal line 256. The fare computation module 250 computes a fare as a function of an initial fare charge, corrected trip distance, elapsed time, real time, and any "extras" in accordance with a fare computation tariff. A display module 258 displays, for example, the computed fare and the trip distance.

Information is sent on a signal line 260 from the fare computation module 236 to the interface circuit 206 and then on a signal line 262 to the GPS receiver/computer module 202.

Information relevant to particular trips is sent from the GPS receiver/computer on a signal line 264 to a data recorder 266 which records, for example, what path was traversed for a trip. Information is also sent on a signal line 268 to a printer 270, which provides, for example, a trip ticket providing appropriate documentation of a trip, for example, to a taxi rider or to a state agency.

The recorded trip information can include a number of items, depending upon the application. For an interstate truck, the information is about when and where a vehicle enters and leaves a predetermined zone, such as a state or municipality. For both taxis and trucks, the trip information includes information showing proof of a path followed by a vehicle. The trip information may include information about delivery of a passenger or goods at a certain site. The trip information can include information about operation of a vehicle, particularly a truck, within safe speed limits. The trip information can also include information about certification of operation within a certain geographic area.

The integrated taximeter and GPS system provided according to the invention uses GPS position, velocity, and time information to produce incontrovertibly accurate corrected odometer input pulses and time signals for the taximeter to precisely compute elapsed time and distance traveled. The integrated taximeter and GPS system taximeter system provided according to the invention also provides for dead reckoning operation of the system when the GPS receiver has service outages.

FIG. 3 is a block diagram of an embodiment of a taximeter system 300, which uses a Scorpion GPS receiver/computer integrated circuit 302 by Trimble Navigation of Sunnyvale, California. The Scorpion integrated circuit 302 is a Trimble Navigation ASIC chip which includes a 68332 microprocessor, A/D circuits, DUARTs. A U.S. patent application, Ser. No. 08/165,972, filed Dec. 10, 1993, by Lau et al. for a "Single-Chip GPS Receiver Digital Signal Processing and Microcomputer" and incorporated herein by reference as background material, provides an integrated GPS receiver/computer integrated circuit. The integrated circuit is a Trimble Navigation ASIC chip which includes a 68332 microprocessor, A/D circuits, DUARTs. The integrated circuit also includes integral circuitry for taking a raw odometer input pulses on a signal line 304 from a odometer 304 and internally processing the raw odometer pulses to obtain corrected, calibrated odometer output pulses. The GPS system verifies and corrects for errors in the raw odometer pulses received by the integrated circuit 302 from an odometer.

The Scorpion integrated circuit 302 also includes integral circuitry for taking a raw odometer input pulses on a signal line 304 from a odometer 304 and internally processing the raw odometer pulses to obtain corrected, calibrated odometer output pulses, which are provided as output signals on a signal line 306. The GPS system verifies and corrects for errors in the raw odometer pulses received by the Scorpion integrated circuit 302 from the odometer 304.

The corrected, calibrated odometer output pulses on signal line 306 are fed into the odometer input terminal of a standard taximeter 308. The taximeter 308 is similar to the taximeter of FIG. 2, discussed herein above. GPS time signals are also fed on a signal line 310 to a real time module 312 of the standard taximeter 308.

As discussed in connection with FIG. 2, a taxi driver provides a start-of-trip signal on an input signal line 320 to activate operation of the taximeter system 308 and to start an elapsed time measurement. Elapsed time is counted in an elapsed-time circuit 322 which is turned on by the start-of-trip signal. At the end of the trip, the taxi driver provides an end-of-trip signal on an input signal line 324 to stop the elapsed time measurement.

A trip distance module 326 receives the corrected odometer pulses on line 306 and elapsed time information on a signal line 328 from the elapsed time module 322.

A fare computation module 330 receives an output signal from the trip distance module 326 on a signal line 332. The fare computation module 330 receives an output signal from the elapsed-time module 322 on a signal line 334. The fare computation module 330 receives an output signal from the real-time module 312 on a signal line 336. The fare computation module 330 computes a fare as a function of an initial fare charge, corrected trip distance, elapsed time, real time, and any "extras" in accordance with a fare computation tariff. A display module 338 displays, for example, the computed fare and the trip distance.

Information is sent on a signal line 340 from the fare computation module 330 to the GPS receiver/computer module 302. Information relevant to particular trips is sent from the GPS receiver/computer on a signal line 342 to a data recorder 344 which records, for example, what path was traversed for a trip. Information is also sent on a signal line 346 to a printer 348, which provides a trip ticket providing appropriate documentation of a trip.

The integrated taximeter and GPS system provided according to the invention uses GPS position, velocity, and time information to produce incontrovertibly accurate corrected tachometer input pulses and GPS time signals for the taximeter to precisely compute elapsed time and distance traveled. As mentioned in connection with the description of FIG. 3, the recorded trip information can include a number of items, depending upon the application. For an interstate truck, the information is about when and where a vehicle enters and leaves a predetermined zone, such as a state or municipality. For both taxis and trucks, the trip information includes information showing proof of a path followed by a vehicle. The trip information may includes information about delivery of a passenger or goods at a certain site. The trip information can include information about operation of a vehicle, particularly a truck, within safe speed limits. The trip information can also include information about certification of operation within a certain geographic area.

With reference next to FIG. 4, a block diagram of a integrated taximeter system 308 and a GPS receiver/computer 305 which are integrated in a single ASIC chip 302. In the present embodiment, all taximeter firmware is embedded within, for example, the Scorpion ASIC chip 302 by Trimble Navigation of Sunnyvale, California. In a manner similar to the embodiment of FIG. 3, in the present embodiment, GPS system 305 verifies and corrects for errors in the raw odometer readings. Hence the present embodiment integrates both the GPS software and the taximeter software onto, for example, the Scorpion ASIC chip 302. Thus, all taximeter calculations are performed by the Scorpion integrated circuit 302. By integrating both GPS system 305 and taximeter system 308, the present embodiment eliminates the potential for fraud or intentional altering of taximeter calculations.

As in the embodiment of FIG. 3, the embodiment of FIG. 4 includes integral circuitry for taking a raw odometer input pulses on a signal line 303 from a odometer 304 and internally processing the raw odometer pulses to obtain corrected, calibrated, odometer output pulses. The corrected odometer output pulses are used by taximeter system 308 of Scorpion chip 302 for calculation of an accurate, incontrovertible, fare.

As discussed above, in operation, a taxi driver provides a start-of-trip signal on an input signal line 320 to activate operation of the taximeter system 308 and to start an elapsed time measurement. At the end of the trip, the taxi driver provides an end-of-trip signal on an input signal line 324 to stop the elapsed time measurement.

The trip fare is calculated as described above in detail in conjunction with the embodiment of FIG. 3. The present embodiment also includes a display module 338, a printer module 348, and an outputs recorder 344.

Hence, the present embodiment provides an incontrovertibly accurate fare. Additionally, by integrating taximeter system 308 and GPS system 305 onto a common ASIC chip, the present embodiment is not susceptible to fraud or intentional altering of fare-related data.

Referring now to FIG. 5, another embodiment of the present invention is shown in which a gyro module 316 is coupled to ASIC chip 302. In the present embodiment, gyro module 316 is used to generate dead reckoning position signals. The dead reckoning position signals are input to ASIC chip 302 as a substitute or in addition to GPS generated position signals.

With reference next to FIG. 6, yet another embodiment of the present invention is shown including a key-activated recording system. As shown in FIG. 6, the present embodiment includes additional features such as a real-time clock 350, a battery 352, and a key-based on/off switch 354. The present embodiment is well suited for logging the miles traveled by a vehicle through, for example a given state. Thus, the present invention is extremely useful for determining state taxes assessed according to the quantity of miles traveled by a vehicle through a given state. In operation, once a vehicle enters a given state or geographic region, key-activated on/off switch 354 is turned on. When the vehicle leaves the state or geographic region, key-activated on/off switch 354 is turned off. The state or geographic region is then able to receive an accurate incontrovertible record of the miles traveled by the vehicle while in the state or geographic region. Real-time clock 350 powered by battery 352 provides a time-stamp which indicates when key-activated switch 354 is turned on and/or off. Therefore, the present embodiment provides a record of the times at which key-activated switch is turned on and/or off. By providing such a record, the present embodiment prevents the intentional or unintentional turning off of key-activated switch while the vehicle travels through the state or geographic region. Thus, the state or geographic region is able to accurately assess taxes upon vehicles moving through the state or geographic region.

Furthermore, the present embodiment is also well suited to having key-activated switch 354 turned on or of by, for example, a state official posted at the border of the state. By having key-activated switch 354 turned on or of by a state official the state is able to precisely monitor and tax vehicles moving therethrough.

Additionally, the embodiments of FIGS. 3–6 are also well suited to having a communication link, not shown, between the integrated GPS/taximeter system and, for example, a tracking station. The communication link is used to transfer information such as, for example, position, fare amount, status, receipts, and the like from a vehicle to a tracking station. The communication link is established using any one of numerous communication link techniques well known in the art.

FIG. 7 is a block diagram of a mileage measurement and logging system 400 which uses a GPS system having a direct output terminal at which are provided corrected odometer pulses. The mileage measurement and logging system 400 is used, for example, with vehicles such as trucks, which have mileage meters which are calibrated and certified by governmental agencies for a specific tire pressure and a certain rim size. When the tire pressure and rim size of a vehicle are changed, distance errors of 3 percent can be obtained. For a state governmental agency which taxes a long-haul truck based on the number of miles driven by the long-haul truck within the state, shortened mileage readings result in significant revenue shortfall for the state.

The mileage measurement and logging system 400 uses a Scorpion GPS receiver/computer integrated circuit 402 which includes a 68332 microprocessor, AID circuits, DUARTs. The Scorpion integrated circuit 402 also includes integral circuitry for taking a raw odometer input pulses on a signal line 403 from an odometer 404 and internally processing the raw odometer pulses to obtain corrected, calibrated odometer output pulses which are provided as output signals on a signal line 406. The GPS system verifies and corrects for errors in the raw odometer pulses received by the Scorpion integrated circuit 302 from the odometer 404.

The corrected, calibrated odometer output pulses on signal line 406 are fed into the odometer input terminal of a standard mileage meter 408. GPS time signals are also fed on a signal line 410 to the mileage meter 408.

Information is sent on a signal line 412 from the fare computation module 330 to the GPS receiver/computer module 402. Information relevant to particular trips is sent from the GPS receiver/computer on a signal line 414 to a data recorder 416. This information includes trip information such as when a vehicle enters or leaves a state, proof of a path followed by a vehicle, delivery of good at a certain site, operation within speed limits, certification of operation within a certain geographic area.

The integrated taximeter and GPS system provided according to the invention uses GPS position, velocity, and time information to produce incontrovertibly accurate corrected odometer input pulses and GPS time signals for the taximeter to precisely compute elapsed time and distance traveled. Also, as mentioned in connection with the description of FIG. 3, the recorded trip information can include a number of items, depending upon the application. For an interstate truck, the information is about when and where a vehicle enters and leaves a predetermined zone, such as a state or municipality. For both taxis and trucks, the trip information includes information showing proof of a path followed by a vehicle. The trip information may include information about delivery of a passenger or goods at a certain site. The trip information can include information about operation of a vehicle, particularly a truck, within safe speed limits. The trip information can also include information about certification of operation within a certain geographic area.

The foregoing descriptions of specific embodiments of the present invention have been presented for the purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

I claim:

1. A calibrated electronic taximeter system for a taxi, comprising:

a GPS receiver/computer system having means for receiving input odometer pulses from an odometer, said GPS receiver/computer system providing GPS information as output signals;

interface means for receiving the GPS information from the GPS receiver/computer system and for providing continuously calibrated odometer output pulses as a function of the received GPS information, when the GPS information is available;

a taximeter having means for receiving calibrated odometer output pulses from the interface means and for receiving the GPS information, said taximeter having means for computing and displaying a taxi fare from the calibrated odometer output pulses and GPS information provided by said GPS receiver/computer system;

wherein the GPS receiver/computer system includes dead reckoning means for providing location information to the GPS computer system during GPS receiver system service outages;

means for providing trip information;

means for recording the trip information; and wherein the trip information includes information selected from the group consisting of information about when and where a vehicle enters and leaves a predetermined zone, information establishing proof of a path followed by a taxi, information about operation within speed limits, and information verifying operation within a certain geographic area.

2. The system of claim 1 wherein the GPS receiver/computer system includes differential GPS means for improving the accuracy of the GPS receiver/system.

3. A method of calibrating a taximeter installed in a taxi vehicle, comprising the steps of:

providing GPS position information and GPS time information as output signals from a GPS receiver/computer system;

receiving input odometer pulses from an odometer;

providing calibrated odometer output pulses as a function of the received GPS velocity information and GPS time information;

computing a taxi fare in a taximeter from the calibrated odometer output pulses provided by said GPS receiver/computer system;

displaying the taxi fare;

using a dead reckoning navigation system for providing location information to the GPS computer system during GPS receiver system service outages;

providing the trip information;

displaying the trip information;

recording the trip information; and wherein the step of providing the trip information includes information selected from the group consisting of the step of providing information about proof of a path followed by a taxi vehicle, providing information about operation of a vehicle within speed limits; and providing information about certification of operation within a certain geographic area.

4. The method of claim 3 including the step of using differential GPS means for improving the accuracy of the GPS receiver/system.

* * * * *